(12) United States Patent
Akutsu

(10) Patent No.: US 12,250,113 B2
(45) Date of Patent: Mar. 11, 2025

(54) SETTING CONTENT CHANGING METHOD OF TERMINAL DEVICE, SETTING CONTENT CHANGING SYSTEM, TERMINAL DEVICE, AND INFORMATION PROCESSING DEVICE

(71) Applicant: NEC Corporation, Tokyo (JP)

(72) Inventor: Yoichi Akutsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 18/267,681

(22) PCT Filed: Mar. 24, 2021

(86) PCT No.: PCT/JP2021/012202
§ 371 (c)(1),
(2) Date: Jun. 15, 2023

(87) PCT Pub. No.: WO2022/201353
PCT Pub. Date: Sep. 29, 2022

(65) Prior Publication Data
US 2024/0106702 A1   Mar. 28, 2024

(51) Int. Cl.
*H04L 41/08* (2022.01)
*H04L 41/0803* (2022.01)

(52) U.S. Cl.
CPC .................. *H04L 41/0803* (2013.01)

(58) Field of Classification Search
CPC . H04L 41/0813; H04L 41/0806; H04L 41/22; H04L 41/0866; H04L 41/0803; H04L 41/084; H04L 41/0846; H04L 41/08
See application file for complete search history.

(56) References Cited

U.S. PATENT DOCUMENTS

2013/0227098 A1*  8/2013  Nebayashi ............ H04W 12/06
                                                     709/222
2021/0409559 A1* 12/2021  Shiotani ............. H04N 1/00413

FOREIGN PATENT DOCUMENTS

JP       2007-304787 A    11/2007
JP       2014-078193 A     5/2014
(Continued)

OTHER PUBLICATIONS

Jooyoung Lee, HyungSeok Kim, Boyu Gao, Hasup Lee, Jee-In Kim and Mingyu Lim, "Synchronized context sharing over multiple devices: Personalized rendering of multimodal contents," 2016 International Conference on Big Data and Smart Computing (BigComp), Hong Kong, 2016, pp. 365-369. (Year: 2016).*

(Continued)

*Primary Examiner* — Messeret F Gebre
(74) *Attorney, Agent, or Firm* — Sughrue Mion, PLLC

(57) ABSTRACT

In order to easily select a change in setting content of a terminal apparatus on a terminal apparatus side, a first terminal apparatus acquires identification information of a second terminal apparatus and reference information which is referred to for changing a setting of the second terminal apparatus, and the first terminal apparatus transmits a setting change request to an external apparatus, the setting change request including the identification information of the second terminal apparatus and the reference information which have been acquired. Then, the second terminal apparatus receives, from the external apparatus, setting change content corresponding to the setting change request, and changes setting content of the second terminal apparatus based on the setting change content.

14 Claims, 10 Drawing Sheets

(56) References Cited

FOREIGN PATENT DOCUMENTS

| JP | 2017-050770 A | 3/2017 |
| JP | 2019-154080 A | 9/2019 |
| WO | 2012/053145 A1 | 4/2012 |

OTHER PUBLICATIONS

Mingju, H., Chiupai, H., & Fengnien, H. (2013). The construction of a knowledge discovery model on in-depth analysis and reporting by exploring Taiwan's examination database. Applied Mechanics and Materials, 262, 207-12. (Year: 2013).*

B. Son, Y. Park and H. Kim, "Implementation of an Auto Configuration Method for the Management Home Server," 2008 Second International Conference on Future Generation Communication and Networking Symposia, Hinan, China, 2008, pp. 53-56, doi: 10.1109/FGCNS.2008.92. (Year: 2008).*

International Search Report for PCT Application No. PCT/JP2021/012202, mailed on Jun. 22, 2021.

* cited by examiner

SETTING CONTENT CHANGING METHOD OF TERMINAL DEVICE, SETTING CONTENT CHANGING SYSTEM, TERMINAL DEVICE, AND INFORMATION PROCESSING DEVICE

This application is a National Stage Entry of PCT/JP2021/012202 filed on Mar. 24, 2021, the contents of all of which are incorporated herein by reference, in their entirety.

TECHNICAL FIELD

The present invention relates to a method for changing setting content of a terminal apparatus, a setting content changing system, a terminal apparatus, and an information processing apparatus.

BACKGROUND ART

Conventionally, a technique for changing setting content of a terminal apparatus is known. As techniques related to this, there are inventions disclosed in Patent Literatures 1 and 2 below.

Patent Literature 1 relates to a setting system for setting a target apparatus based on setting information. In the setting system, a terminal apparatus includes: a reading means that reads and acquires, from a setting apparatus, setting information which is information for setting the setting apparatus; and a setting information transmission means that transmits the acquired setting information to a server. The server includes: a setting information reception means that receives setting information which has been transmitted from the setting information transmission means; and a setting instruction means that selects a setting apparatus to be set based on the setting information, and that instructs the selected setting apparatus to carry out setting. The setting apparatus includes a setting means that carries out setting of the setting apparatus in accordance with an instruction from the setting instruction means.

Patent Literature 2 relates to an information processing apparatus for connecting a communication apparatus to a network. The information processing apparatus includes: an initial registration information storage section that receives, from a terminal apparatus, individual identification information via a first network and stores the individual identification information, the individual identification information being identification information with respect to a target communication apparatus to be processed; a setting information acquisition section that (i) detects, based on address information which is allocated to a target communication apparatus to be processed, the target communication apparatus, (ii) receives individual identification information from the target communication apparatus via a second network, and (iii) acquires setting information which is to be set for the target communication apparatus; and a setting control section that causes a predetermined storage area of the target communication apparatus to store the setting information acquired by the setting information acquisition section.

CITATION LIST

Patent Literature

[Patent Literature 1]
PCT International Publication No. 2012-053145
[Patent Literature 2]
Japanese Patent Application Publication Tokukai No. 2019-154080

SUMMARY OF INVENTION

Technical Problem

In Patent Literature 1, the server receives a setting status which has been sent from the setting apparatus, confirms the setting status, and transmits a setting instruction to the setting apparatus. Therefore, it is impossible to select a setting change on the setting apparatus side and the terminal apparatus side and send a setting change request to the server.

In Patent Literature 2, the server receives, via the second network, individual identification information from the target communication apparatus to be processed, and acquires setting information which is to be set for the target communication apparatus. Therefore, as with Patent Literature 1, it is impossible to select a setting change on the target communication apparatus side and the terminal apparatus side, and send a setting change request to the server.

An example aspect of the present invention is accomplished in view of the above problems, and its example object is to provide a technique that makes it possible to easily select, on the terminal apparatus side, a change of setting content of the terminal apparatus.

Solution to Problem

A method for changing setting content in accordance with an example aspect of the present invention includes: acquiring, by a first terminal apparatus, identification information of a second terminal apparatus and reference information which is referred to for changing a setting of the second terminal apparatus; transmitting, by the first terminal apparatus, a setting change request to an external apparatus, the setting change request including the identification information of the second terminal apparatus and the reference information which have been acquired; and receiving, by the second terminal apparatus, setting change content corresponding to the setting change request from the external apparatus, and changing, by the second terminal apparatus, setting content of the second terminal apparatus based on the setting change content.

A setting content changing system in accordance with an example aspect of the present invention includes a first terminal apparatus, a second terminal apparatus, and an external apparatus, the first terminal apparatus including at least one first processor, the at least one first processor carrying out an acquisition process of acquiring identification information of the second terminal apparatus and reference information which is referred to for changing a setting of the second terminal apparatus and a transmission process of transmitting a setting change request to the external apparatus, the setting change request including the identification information of the second terminal apparatus and the reference information which have been acquired, and the second terminal apparatus including at least one second processor, the at least one second processor carrying out a reception process of receiving, from the external apparatus, setting change content corresponding to the setting change request, and a changing process of changing setting content of the second terminal apparatus based on the setting change content.

A terminal apparatus in accordance with an example aspect of the present invention: includes at least one processor, the at least one processor carrying out: an acquisition process of acquiring identification information of a target terminal apparatus whose setting is to be changed and reference information which is referred to for changing the setting of the target terminal apparatus; and a transmission process of transmitting a setting change request which includes the identification information and the reference information which have been acquired.

An information processing apparatus in accordance with an example aspect of the present invention includes: a reception means that receives a setting change request which includes (i) identification information of a target terminal apparatus whose setting is to be changed and (ii) reference information which is referred to for changing the setting of the target terminal apparatus; and a transmission means that transmits, to the target terminal apparatus which is designated by the identification information, an instruction for changing the setting to setting content which is specified by the reference information.

A method for changing setting content of a terminal apparatus in accordance with an example aspect of the present invention includes: acquiring identification information of a target terminal apparatus whose setting is to be changed and reference information which is referred to for changing the setting of the target terminal apparatus; and transmitting a setting change request which includes the identification information and the reference information which have been acquired.

A method for providing an instruction for changing a setting of an information processing apparatus in accordance with an example aspect of the present invention includes: receiving a setting change request which includes (i) identification information of a target terminal apparatus whose setting is to be changed and (ii) reference information which is referred to for changing the setting of the target terminal apparatus; and transmitting, to the target terminal apparatus which is designated by the identification information, an instruction for changing the setting to setting content which is specified by the reference information.

Advantageous Effects of Invention

According to an example aspect of the present invention, it is possible to easily select, on the terminal apparatus side, a change of setting content of the terminal apparatus.

EXAMPLE EMBODIMENTS

First Example Embodiment

The following description will discuss an example embodiment of the present invention in detail with reference to the drawings. The present example embodiment is a basic form of example embodiments described later.

(Configuration of Setting Content Changing System 100)

Figure 1:
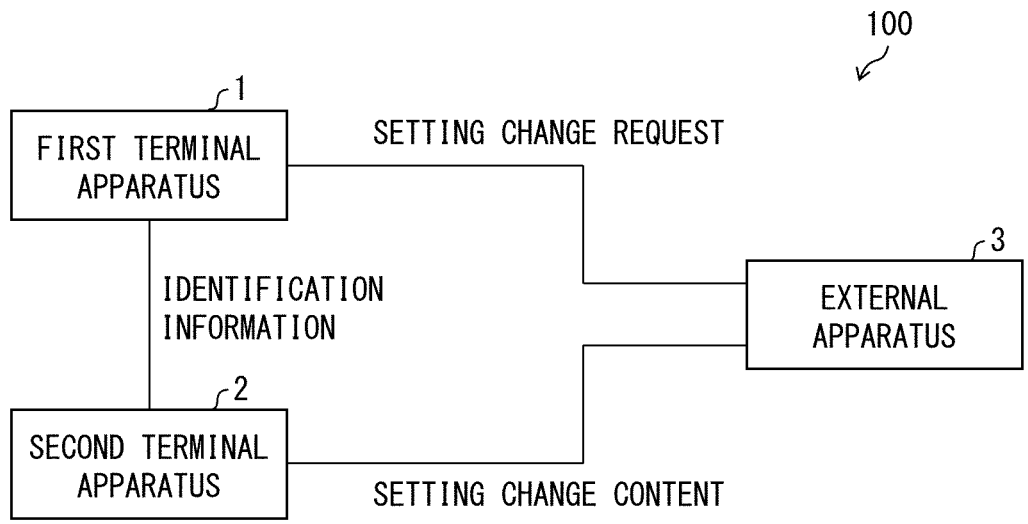
FIG. 1 is a block diagram illustrating a configuration example of a setting content changing system according to a first example embodiment of the present invention.

The following description will discuss a configuration of a setting content changing system 100 according to the present example embodiment, with reference to FIG. 1. FIG. 1 is a block diagram illustrating a configuration example of the setting content changing system 100 according to a first example embodiment of the present invention. The setting content changing system 100 includes a first terminal apparatus 1, a second terminal apparatus 2, and an external apparatus 3.

The first terminal apparatus 1 acquires identification information of the second terminal apparatus 2 and reference information which is referred to for changing a setting of the second terminal apparatus 2. The identification information is, for example, an individual management number or the like which is given to the second terminal apparatus 2. The reference information is information which is referred to for changing a setting of the terminal apparatus 2. For example, in a case where setting content of the second terminal apparatus 2 is caused to match setting content of another terminal apparatus, the reference information includes identification information for identifying that terminal apparatus.

For example, the first terminal apparatus 1 captures an image of a Quick Response (QR) code (registered trademark) that is attached to the second terminal apparatus 2 and that includes an individual management number for identifying an individual of the second terminal apparatus 2. Further, the first terminal apparatus 1 analyzes the captured image to acquire the individual management number of the second terminal apparatus 2 which is included in the QR code (registered trademark).

The first terminal apparatus 1 transmits, to the external apparatus 3, a setting change request which includes the identification information of the second terminal apparatus 2 and the reference information which have been acquired. The setting change request is a request that is transmitted by the first terminal apparatus 1 to the external apparatus 3 for changing setting content of the second terminal apparatus 2. The setting change request is transmitted to the external apparatus via, for example, a wide area communication network such as the Internet.

The external apparatus 3 manages an individual management number of a terminal apparatus, and stores a destination address of the terminal apparatus corresponding to the individual management number of the terminal apparatus. Upon receipt of the individual management number of the second terminal apparatus 2 and the reference information from the first terminal apparatus 1, the external apparatus 3 extracts a destination address of the second terminal apparatus 2. Then, the external apparatus 3 extracts setting change content corresponding to the setting change request, and transmits the setting change content to the destination address of the second terminal apparatus 2.

The second terminal apparatus 2 receives, from the external apparatus 3, setting change content corresponding to the setting change request, and changes setting content of the second terminal apparatus 2 based on the setting change content. The setting change content is setting data which is actually set in the second terminal apparatus 2, and the second terminal apparatus 2 changes the setting content in accordance with this setting data.

(Flow of Method for Changing Setting Content)

Figure 2:
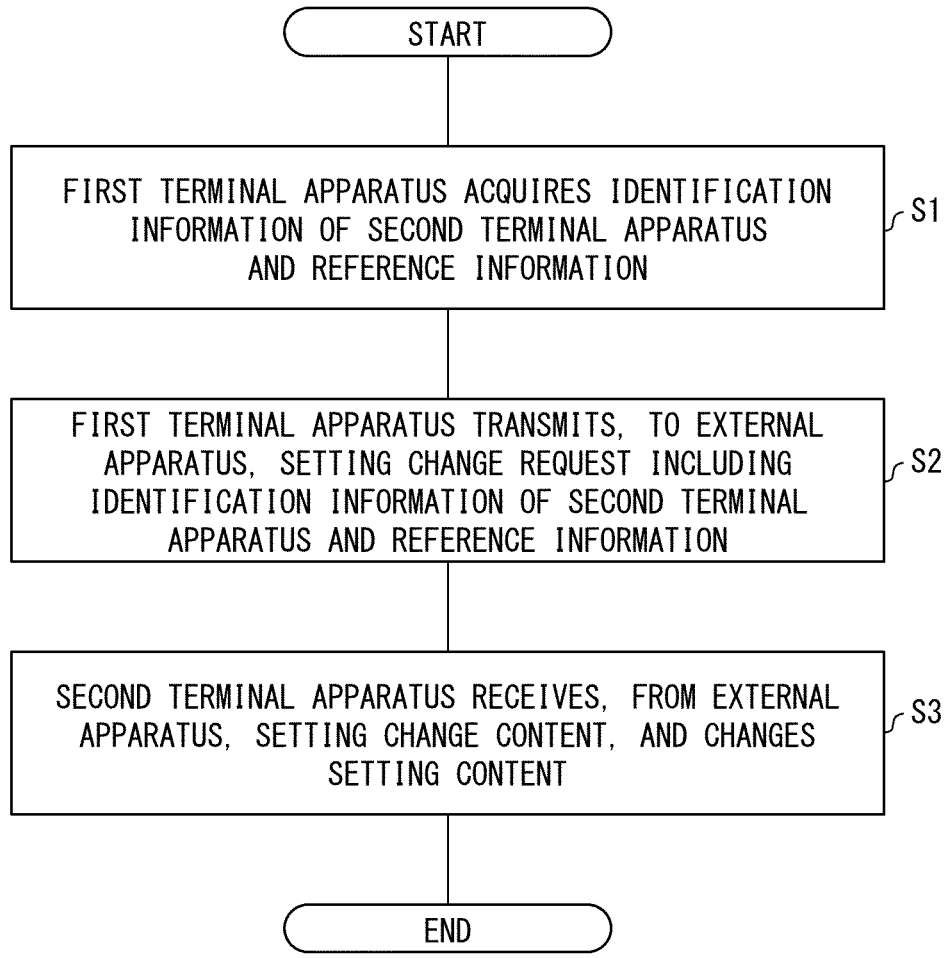
FIG. 2 is a flowchart illustrating a flow of a method for changing setting content by the setting content changing system according to the first example embodiment of the present invention.

FIG. 2 is a flowchart illustrating a flow of a method for changing setting content by the setting content changing system 100 according to the first example embodiment of the present invention. First, the first terminal apparatus 1 acquires identification information of the second terminal apparatus 2 and reference information which is referred to for changing a setting of the second terminal apparatus 2 (S1).

Next, the first terminal apparatus 1 transmits, to the external apparatus 3, a setting change request which includes the identification information of the second terminal apparatus 2 and the reference information which have been acquired (S2).

Lastly, the second terminal apparatus 2 receives, from the external apparatus 3, setting change content corresponding to the setting change request, and changes setting content of the second terminal apparatus based on the setting change content (S3), and the process ends.

As described above, in the setting content changing method according to the present example embodiment, the first terminal apparatus 1 transmits, to the external apparatus 3, a setting change request which includes the identification information of the second terminal apparatus 2 and the reference information which have been acquired. Therefore, it is possible to easily select, on the first terminal apparatus 1 side, a change of setting content of the second terminal apparatus 2. Moreover, it is possible to change a setting of the second terminal apparatus 2 merely by acquiring identification information of the second terminal apparatus 2 and reference information by the first terminal apparatus 1, and transmitting a setting change request by the first terminal apparatus 1.

Second Example Embodiment (Configuration of First Terminal Apparatus 1)

Figure 3:
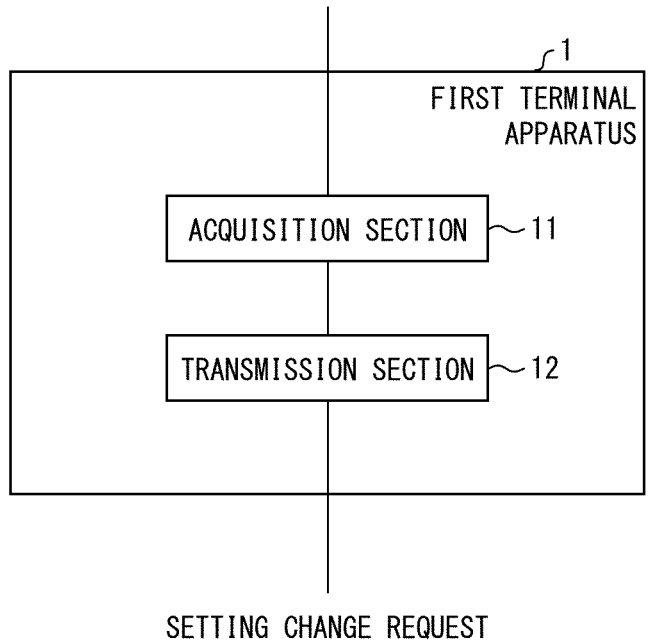
FIG. 3 is a block diagram illustrating a functional configuration of a first terminal apparatus according to a second example embodiment of the present invention.

The following description will discuss a configuration of a first terminal apparatus 1 according to the present example embodiment, with reference to FIG. 3. FIG. 3 is a block diagram illustrating a functional configuration of the first terminal apparatus 1 according to the second example embodiment of the present invention. The first terminal apparatus 1 includes an acquisition section 11 and a transmission section 12. Examples of the first terminal apparatus 1 include, but not limited to, mobile terminals such as a smart phone, a mobile phone, an IP phone, and a tablet.

The acquisition section 11 acquires identification information of a target terminal apparatus (second terminal apparatus 2) whose setting is to be changed and reference information which is referred to for changing the setting of the target terminal apparatus (second terminal apparatus 2).

The transmission section 12 transmits a setting change request which includes the identification information and the reference information which have been acquired by the acquisition section 11.

Figure 4:
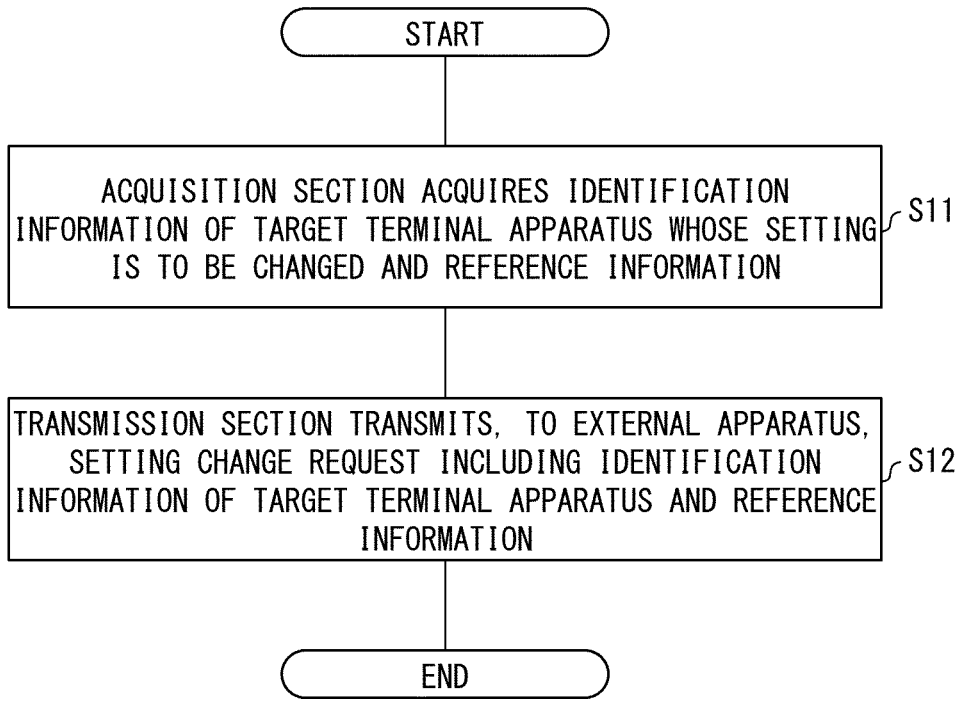
FIG. 4 is a flowchart for describing process procedures of the first terminal apparatus according to the second example embodiment of the present invention.

FIG. 4 is a flowchart for describing process procedures of the first terminal apparatus 1 according to the second example embodiment of the present invention. First, the acquisition section 11 acquires identification information of a target terminal apparatus (second terminal apparatus 2) whose setting is to be changed and reference information which is referred to for changing the setting of the target terminal apparatus (second terminal apparatus 2) (S11).

Next, the transmission section 12 transmits a setting change request which includes the identification information and the reference information which have been acquired (S12), and the process ends.

As described above, in the first terminal apparatus 1 according to the present example embodiment, the acquisition section 11 acquires identification information of the target terminal apparatus whose setting is to be changed and reference information which is referred to for changing the setting of the target terminal apparatus, and transmits a setting change request to the external apparatus 3. Therefore, it is possible to easily select, on the first terminal apparatus 1 side, a change of setting content of the target terminal apparatus whose setting is to be changed.

Third Example Embodiment (Configuration of Second Terminal Apparatus 2)

Figure 5:
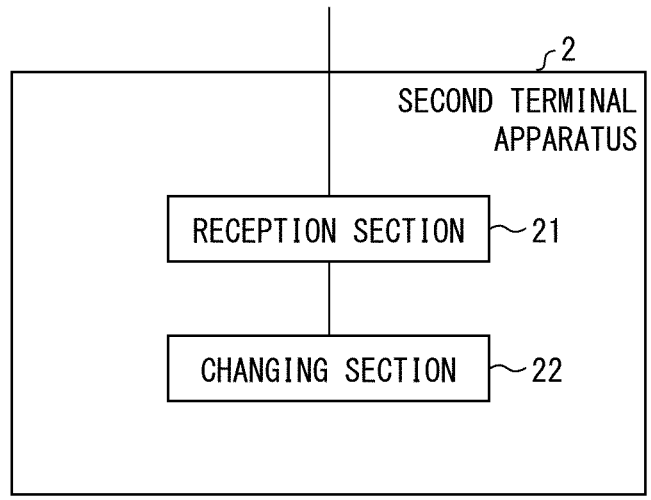
FIG. 5 is a block diagram illustrating a functional configuration of a second terminal apparatus according to a third example embodiment of the present invention.

The following description will discuss a configuration of a second terminal apparatus 2 according to the present example embodiment, with reference to FIG. 5. FIG. 5 is a block diagram illustrating a functional configuration of the second terminal apparatus 2 according to the third example embodiment of the present invention. The second terminal apparatus 2 includes a reception section 21 and a changing section 22. Examples of the second terminal apparatus 2 include, but not limited to, mobile terminals such as a public safety communication terminal (hereinafter, simply referred to as a communication terminal), a mobile phone, an IP phone, and a tablet.

Note that the standard of the communication terminal may be a next-generation high-speed portable communication standard (long term evolution (LTE)), a fifth-generation mobile communication system (5G), or any of other communication standards.

The reception section 21 receives, from the external apparatus 3, setting change content corresponding to a setting change request. The changing section 21 changes setting content of the second terminal apparatus 2 based on the setting change content.

Figure 6:
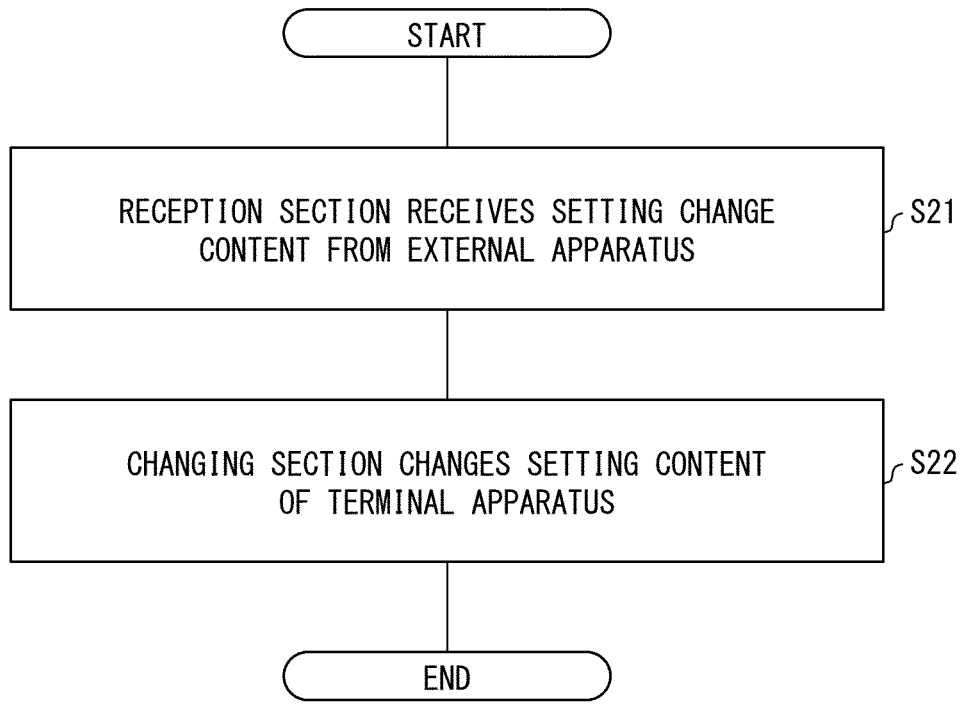
FIG. 6 is a flowchart for describing process procedures of the second terminal apparatus according to the third example embodiment of the present invention.

FIG. 6 is a flowchart for describing process procedures of the second terminal apparatus 2 according to the third example embodiment of the present invention. First, the reception section 21 receives, from the external apparatus 3, setting change content corresponding to a setting change request (S21).

Next, the changing section 22 changes setting content of the second terminal apparatus 2 based on the setting change content (S22), and the process ends.

As described above, in the second terminal apparatus 2 according to the present example embodiment, the changing section 22 changes setting content of the second terminal apparatus 2 based on setting change content which has been received by the reception section 21. Therefore, it is possible to change the setting of the second terminal apparatus 2 based on the setting content that has been selected on the first terminal apparatus 1 side.

Fourth Example Embodiment (Configuration of External Apparatus 3)

Figure 7:
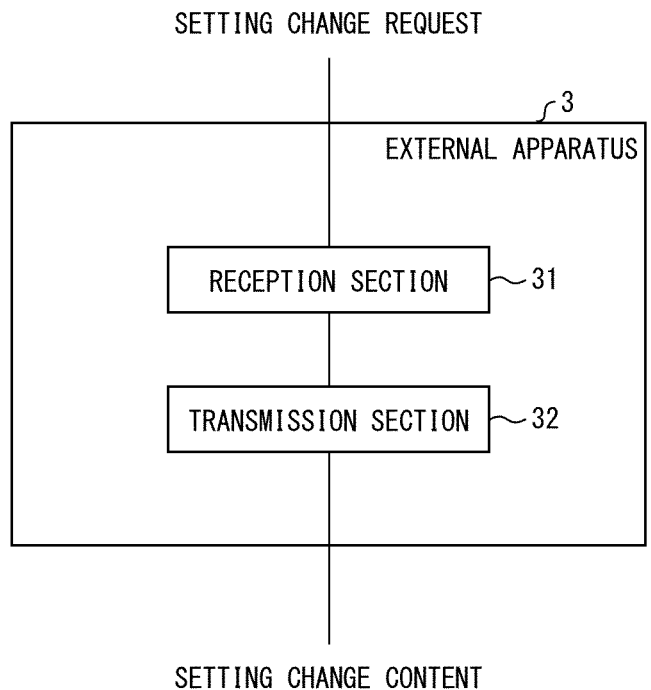
FIG. 7 is a block diagram illustrating a functional configuration of an external apparatus according to a fourth example embodiment of the present invention.

The following description will discuss a configuration of an external apparatus (information processing apparatus) 3 according to the present example embodiment, with reference to FIG. 7. FIG. 7 is a block diagram illustrating a functional configuration of the external apparatus 3 according to the fourth example embodiment of the present invention. The external apparatus 3 includes a reception section 31 and a transmission section 32. Examples of the external apparatus 3 include, but not limited to, a server apparatus which is connected via a wide area communication network such as the Internet, and the like.

The reception section 31 receives a setting change request which includes (i) identification information of a target terminal apparatus (second terminal apparatus 2) whose setting is to be changed and (ii) reference information which is referred to for changing the setting of the target terminal apparatus (second terminal apparatus 2).

The transmission section 32 transmits, to a terminal apparatus (second terminal apparatus 2) which is designated by the identification information, an instruction for changing the setting to setting content which is specified by the reference information.

Figure 8:
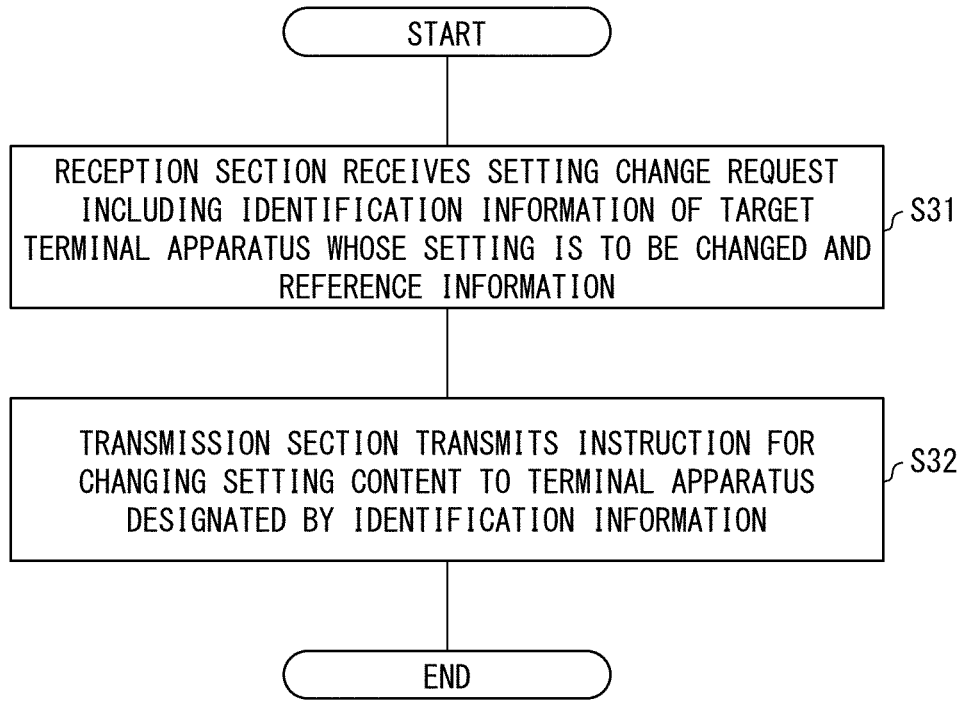
FIG. 8 is a flowchart for describing process procedures of the external apparatus according to the fourth example embodiment of the present invention.

FIG. 8 is a flowchart for describing process procedures of the external apparatus (information processing apparatus) 3 according to the fourth example embodiment of the present invention. First, the reception section 31 receives a setting change request which includes (i) identification information of a target terminal apparatus (second terminal apparatus 2) whose setting is to be changed and (ii) reference information which is referred to for changing the setting of the target terminal apparatus (second terminal apparatus 2) (S31).

Next, the transmission section 32 transmits, to a terminal apparatus (second terminal apparatus 2) which is designated by the identification information, an instruction for changing the setting to setting content which is specified by the reference information (S32), and the process ends.

As described above, in the external apparatus 3 according to the present example embodiment, the transmission section 32 transmits, to the terminal apparatus designated by the identification information, an instruction for changing the setting to setting content which is specified by the reference information. Therefore, it is possible to change the setting of the second terminal apparatus 2 based on the setting content that has been selected on the first terminal apparatus 1 side.

Fifth Example Embodiment (Specific Process Flow of Setting Content Changing System 100)

Figure 9:
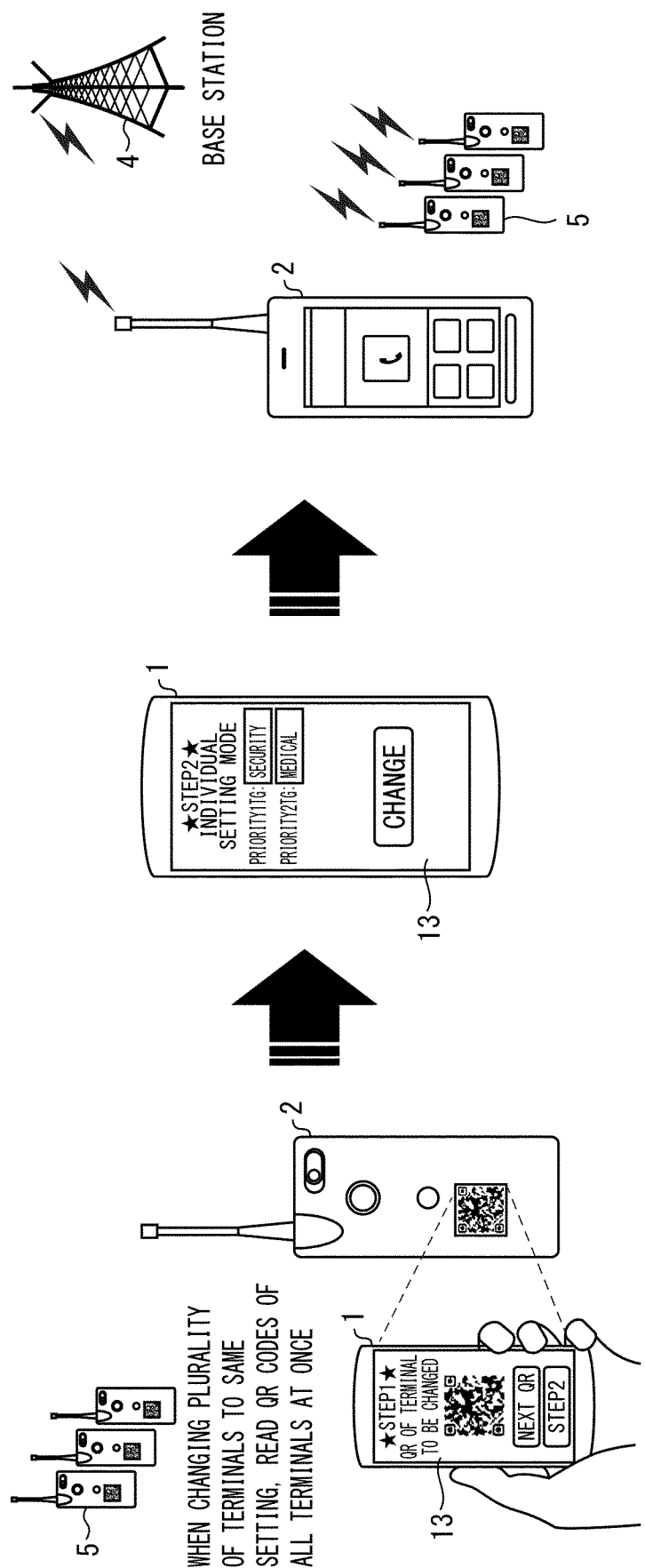
FIG. 9 is a diagram illustrating a specific process flow of a setting content changing system according to a fifth example embodiment of the present invention.

FIG. 9 is a diagram illustrating a specific process flow of a setting content changing system 100 according to the fifth example embodiment of the present invention. A first terminal apparatus 1 displays setting change items of a second terminal apparatus 2, and transmits, to an external apparatus 3, a setting change request in which a selected setting change item is included as reference information. The setting change item refers to an item which is displayed on the first terminal apparatus 1 illustrated in FIG. 9, and which is used for setting a talk group for security measures, medical care, or the like.

The first terminal apparatus 1 can further include a display section 13 that displays setting change items of the second terminal apparatus 2. In this case, the transmission section 12 can transmit, to the external apparatus, a setting change request in which a setting change item that has been selected from display of the display section 13 is included as reference information.

In addition, in a case where there are a plurality of terminal apparatuses to be changed in setting, it is possible that the first terminal apparatus 1 obtains identification information of a third terminal apparatus 5, and the first terminal apparatus 1 transmits, to the external apparatus 3, a setting change request which includes (i) the acquired identification information of the second terminal apparatus 2, (ii) the acquired identification information of the third terminal apparatus 5, and (iii) the acquired reference information which is referred to for changing settings of the second terminal apparatus 2 and the third terminal apparatus 5.

The second terminal apparatus 2 and the third terminal apparatus 5 receive, from the external apparatus 3, setting change content corresponding to the setting change request, and change setting content of the second terminal apparatus 2 and the third terminal apparatus 5 based on the setting change content.

In a case where there are a plurality of terminal apparatuses to be changed in setting, it is possible that the acquisition section 11 obtains identification information of the third terminal apparatus 5, and the transmission section 12 transmits, to the external apparatus, a setting change request which includes (i) the acquired identification information of the second terminal apparatus 2, (ii) the acquired identification information of the third terminal apparatus 5, and (iii) the acquired reference information which is referred to for changing settings of the second terminal apparatus 2 and the third terminal apparatus 5.

The second terminal apparatus 2 and the third terminal apparatus 5 receive, from the external apparatus 3, setting change content corresponding to the setting change request, and change setting content of the second terminal apparatus 2 and the third terminal apparatus 5 based on the setting change content.

Note that, in the following descriptions, a smart phone is used as an example of the first terminal apparatus 1, a communication terminal is used as an example of the second terminal apparatus 2, and a server is used as an example of the external apparatus (information processing apparatus) 3.

The communication terminal 2 is developed as a radio for business use, and is characterized by being capable of carrying out intergroup communication of one-to-N, unlike a mobile phone or the like that carries out one-to-one communication. By setting the same talk group for a plurality of communication terminals, it is possible for a plurality of users to have a conversation at the same time.

As illustrated in FIG. 9, a QR code (registered trademark) including an individual management number is attached to the communication terminal 2, and the QR code (registered trademark) of the communication terminal 2 whose setting is to be changed is read by the by the smart phone 1 (S41).

Next, setting change items are displayed on the smart phone 1, and a user selects a setting change item (S42). In FIG. 9, the display section 13 of the smart phone 1 displays an item of security measures and an item of medical care as setting change items. The user can select either the item of security measures or the item of medical care. The item of security measures is an item for setting the communication terminal 2 to a talk group for security measures. The item of medical care is an item for setting the communication terminal 2 to a talk group for medical care.

Then, the smart phone 1 transmits, to a server 3 via a base station 4, the individual management number which has been obtained by reading the QR code (registered trademark) of the terminal 2 and the setting change item which has been selected by the user.

Upon receipt of the setting change request from the smart phone 1 via the base station 4, the server 3 prepares setting change content and transmits the setting change content to the communication terminal 2. For example, in a case where the item of security measures has been selected as a setting change item, the server 3 prepares setting change content for setting the communication terminal 2 to a talk group for security measures, and transmits the setting change content to the communication terminal 2.

The communication terminal 2 receives the setting change content corresponding to the setting change item that has been selected by the user using the smart phone 1 from the server 3 via the base station 4, and sets the setting change content in the communication terminal 2 (S43).

In a case where there are a plurality of communication terminals whose setting is to be changed, the smart phone 1 reads all QR codes (registered trademark) of the plurality of communication terminals 2 and 5 (S41). Then, setting change items are displayed on the smart phone 1, and the user selects a setting change item (S42). The setting change content is transmitted to the plurality of communication terminals 2 and 5, and the setting change content is set in the plurality of communication terminals 2 and 5 (S43).

As described above, the smart phone 1 transmits, to the server 3 via the base station 4, the setting change request in which the individual management number of the communication terminal 2 and the setting change item that has been selected by the user are included. Then, the communication terminal 2 receives setting change content from the server 3, and sets the setting change content in the communication terminal 2. As such, the user reads the QR code (registered trademark) of the communication terminal 2 by the smart phone 1, selects a setting change item, and transmits the setting change item to the server 3. Merely with this operation, it is possible to change setting content of the communication terminal 2, so that it is possible to shorten an operation time.

Moreover, it is possible to change setting content of the plurality of communication terminals 2 and 5 at a time by reading the QR codes (registered trademark) of the plurality of communication terminals 2 and 5 by the smart phone 1. As described above, it is possible for a plurality of users to have a conversation at the same time by setting the same talk group for a plurality of communication terminals. Therefore, by changing setting content of the plurality of communication terminals 2 and 5 at a time, it is possible to further shorten the operation time.

Sixth Example Embodiment (Specific Process Flow of Setting Content Changing System 100)

Figure 10:
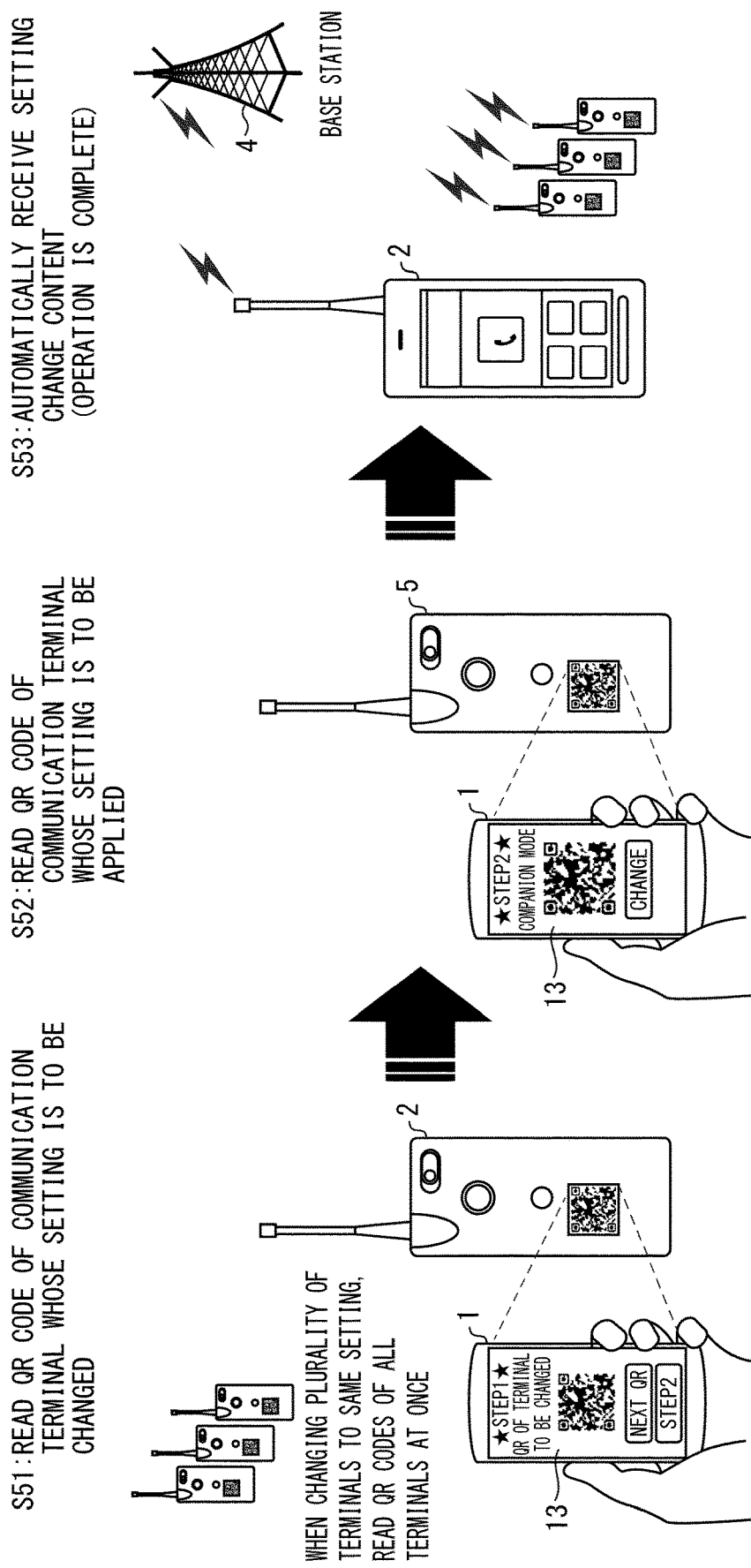
FIG. 10 is a diagram illustrating a specific process flow of a setting content changing system according to a sixth example embodiment of the present invention.

FIG. 10 is a diagram illustrating a specific process flow of a setting content changing system 100 according to the sixth example embodiment of the present invention. A first terminal apparatus 1 acquires identification information of a third terminal apparatus 5, and the first terminal apparatus 1 transmits, to an external apparatus 3, a setting change request in which the identification information of the third terminal apparatus 5 is included as reference information.

A second terminal apparatus 2 receives setting change content corresponding to the third terminal apparatus 3, and changes setting content of the second terminal apparatus 2 based on the setting change content.

It is possible that the setting content changing system 100 further includes the third terminal apparatus 5, an acquisition section 11 acquires identification information of the third terminal apparatus 5, and a transmission section 12 transmits, to the external apparatus 3, a setting change request in which the identification information of the third terminal apparatus 5 is included as reference information.

A reception section 21 receives setting change content corresponding to the third terminal apparatus 5, and a changing section 22 changes setting content of the second terminal apparatus 2 based on the setting change content.

As illustrated in FIG. 10, the smart phone 1 reads a QR code (registered trademark) of a communication terminal 2 whose setting is to be changed (S51).

Next, the smart phone 1 reads a QR code (registered trademark) of a communication terminal 5 whose setting is to be applied to another communication terminal (S52). Then, the smart phone 1 transmits, to the server 3 via the base station, an individual management number obtained by reading the QR code (registered trademark) of the communication terminal 2 and an individual management number of the communication terminal 5 whose setting is to be applied.

Upon receipt of a setting change request from the smart phone 1 via the base station 4, the server 3 acquires setting change content of the communication terminal 5 and transmits the setting change content to the communication terminal 2 as setting change content of the communication terminal 2.

The communication terminal 2 receives, from the server 3 via the base station 4, the setting change content corresponding to the communication terminal 5 whose setting is to be applied, and sets the setting change content in the communication terminal 2 (S53).

As described above, the smart phone 1 transmits, to the server 3 via the base station 4, the setting change request in which the individual management number of the communication terminal 2 and the individual management number of the communication terminal 5 whose setting is to be applied are included. Then, the communication terminal 2 receives, from the server 3, setting change content corresponding to the communication terminal 5 whose setting is to be applied, and sets the setting change content in the communication terminal 2. As such, the user reads the QR code (registered trademark) of the communication terminal 2 and the QR code (registered trademark) of the communication terminal 5 by the smart phone 1, and transmits them to the server 3. Merely with this operation, it is possible to change setting content of the communication terminal 2 such that the setting content matches that of the communication terminal 5, and it is therefore possible to shorten an operation time.

Seventh Example Embodiment (Specific Process Flow of Setting Content Changing System 100)

Figure 11:
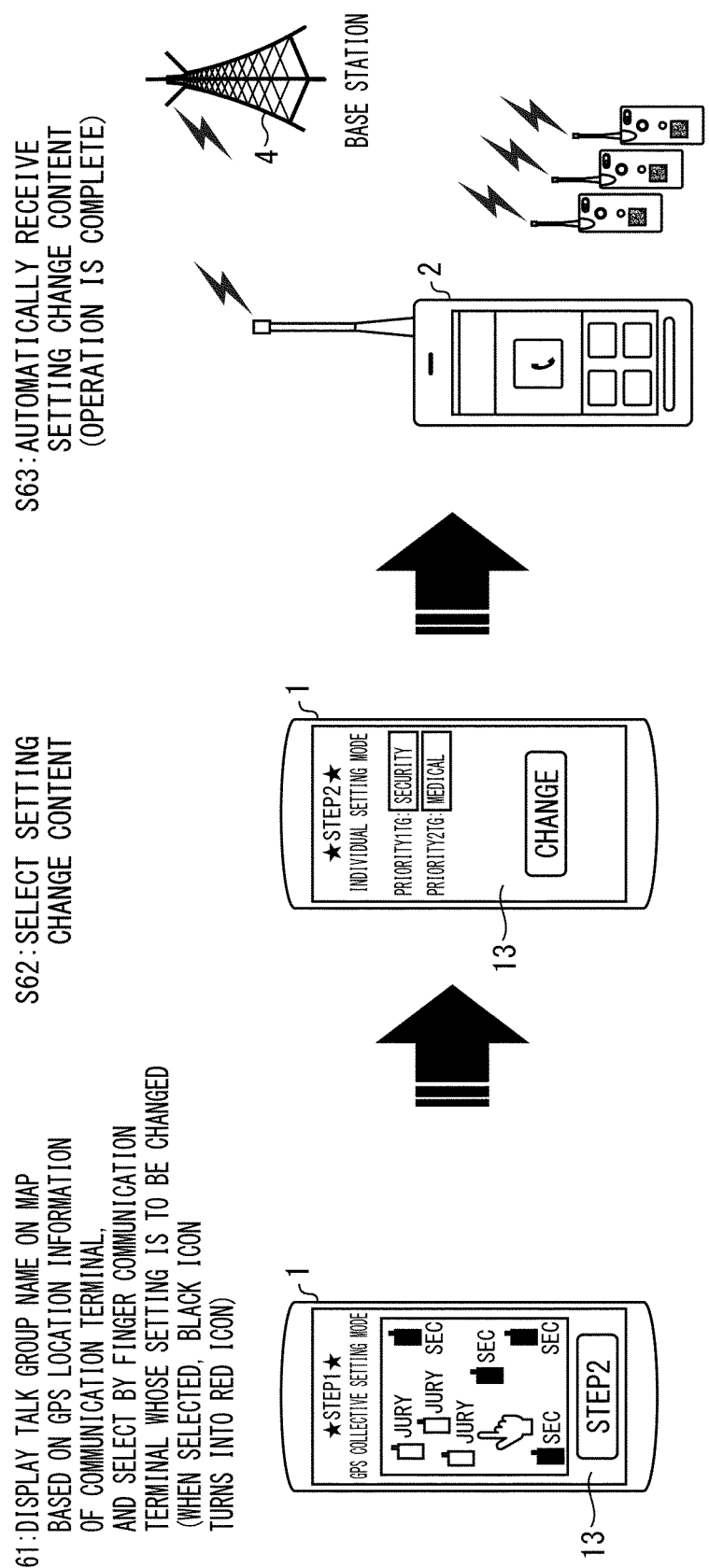
FIG. 11 is a diagram illustrating a specific process flow of a setting content changing system according to a seventh example embodiment of the present invention.

FIG. 11 is a diagram illustrating a specific process flow of a setting content changing system 100 according to a seventh example embodiment of the present invention. A first terminal apparatus 1 displays images respectively corresponding to a plurality of other terminal apparatuses including a second terminal apparatus 2 based on pieces of location information of the plurality of other terminal apparatuses. Then, the first terminal apparatus 1 acquires identification information of another terminal apparatus corresponding to an image that has been selected.

The first terminal apparatus 1 transmits, to the external apparatus 3, a setting change request which includes (i) the identification information of the terminal apparatus corresponding to the image that has been selected and (ii) reference information which is referred to for changing a setting of that terminal apparatus.

The terminal apparatus corresponding to the image that has been selected receives, from the external apparatus 3, setting change content corresponding to the setting change request, and changes, based on the setting change content, setting content of the terminal apparatus corresponding to the image that has been selected.

It is possible that the first terminal apparatus 1 further includes a display section 13 that displays images respectively corresponding to the plurality of other terminal apparatuses including the second terminal apparatus 2 based on pieces of location information of the plurality of other terminal apparatuses, and the acquisition section 11 acquires identification information of another terminal apparatus corresponding to an image that has been selected from the images displayed on the display section 13.

The transmission section 12 transmits, to the external apparatus 3, a setting change request which includes (i) the identification information of the terminal apparatus corresponding to the image that has been selected and (ii) reference information which is referred to for changing a setting of that terminal apparatus. The terminal apparatus corresponding to the image that has been selected receives, from the external apparatus 3, setting change content corresponding to the setting change request, and changes, based on the setting change content, setting content of the terminal apparatus corresponding to the image that has been selected.

As illustrated in FIG. 11, images corresponding to respective other communication terminals are displayed on a map on the display section 13 of the smart phone 1 based on pieces of location information of those other communication terminals. For example, the server 3 manages pieces of location information of all communication terminals, and transmits, to the smart phone 1, the pieces of location information and individual management numbers of all the communication terminals, and information indicating to which talk group each of the communication terminals belongs, in response to a request from the smart phone 1. For example, location information of a communication terminal is acquired by a global positioning system (GPS) or the like.

The smart phone 1 receives, from the server 3, pieces of location information of respective communication terminals and information indicating to which talk group each of the communication terminals belongs. The smart phone 1 displays, on the display section 13, icons of the communication terminals corresponding to positions on the screen corresponding to the respective pieces of location information of the communication terminals. Furthermore, the smart phone 1 displays information (talk group name) indicating to which talk group each of the communication terminals displayed on the display section 13 belongs. The user touches an icon of a communication terminal displayed on the display section 13 to select a communication terminal whose setting is to be changed (S61). At this time, it is possible that a color of the icon of the communication terminal that has been selected by the user is changed from black to red so that the icon can be distinguished from icons of the other communication terminals.

Next, setting change items are displayed on the smart phone 1, and a user selects a setting change item (S62). In FIG. 11, the display section 13 of the smart phone 1 displays an item of security measures and an item of medical care as setting change items. For example, in a case where the user changes a talk group of the selected communication terminal from a talk group for security measures to a talk group for medical care, the item of medical care is selected.

Then, the smart phone 1 transmits, to the server 3 via the base station 4, an individual management number of the selected communication terminal and the setting change item that has been selected by the user. Upon receipt of a setting change request from the smart phone 1 via the base station 4, the server 3 prepares setting change content and transmits the setting change content to the selected communication terminal.

The selected communication terminal receives the setting change content corresponding to the setting change item that has been selected by the user using the smart phone 1 from the server 3 via the base station 4, and sets the setting change content in the selected communication terminal (S63).

As described above, the user selects the icon of the communication terminal displayed on the display section 13 of the smart phone 1, and transmits, to the server 3 via the base station 4, the individual management number of the communication terminal that has been selected and the setting change item that has been selected by the user. As such, the user selects the icon of the communication terminal and a setting change item which are displayed on the display section 13. Merely with this operation, it is possible to change setting content of the communication terminal, so that it is possible to shorten an operation time.

Figure 12:
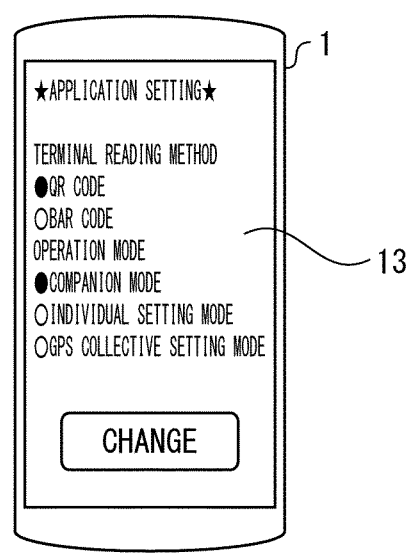
FIG. 12 is a diagram illustrating an example of a setting change screen of a smart phone.

FIG. 12 is a diagram illustrating an example of a setting change screen of the smart phone 1. As a terminal reading method, either a QR code (registered trademark) or a bar code can be selected. In either case where the QR code (registered trademark) or the bar code is selected, the first terminal apparatus (smart phone) 1 captures an image that has been given to the second terminal apparatus (communication terminal) 2, and analyzes the image to acquire identification information of the second terminal apparatus 2.

It is possible that the acquisition section 11 captures an image that has been given to the second terminal apparatus (communication terminal) 2, and analyzes the image to acquire identification information of the second terminal apparatus. With the configuration, it is possible for the first terminal apparatus to easily acquire identification information of the second terminal apparatus.

Moreover, it is possible to select one of a companion mode (corresponding to the sixth example embodiment), an individual setting mode (corresponding to the fifth example embodiment), and a GPS collective setting mode (corresponding to the seventh example embodiment) as an operation mode. For details, refer to the example embodiments above.

Figure 13:
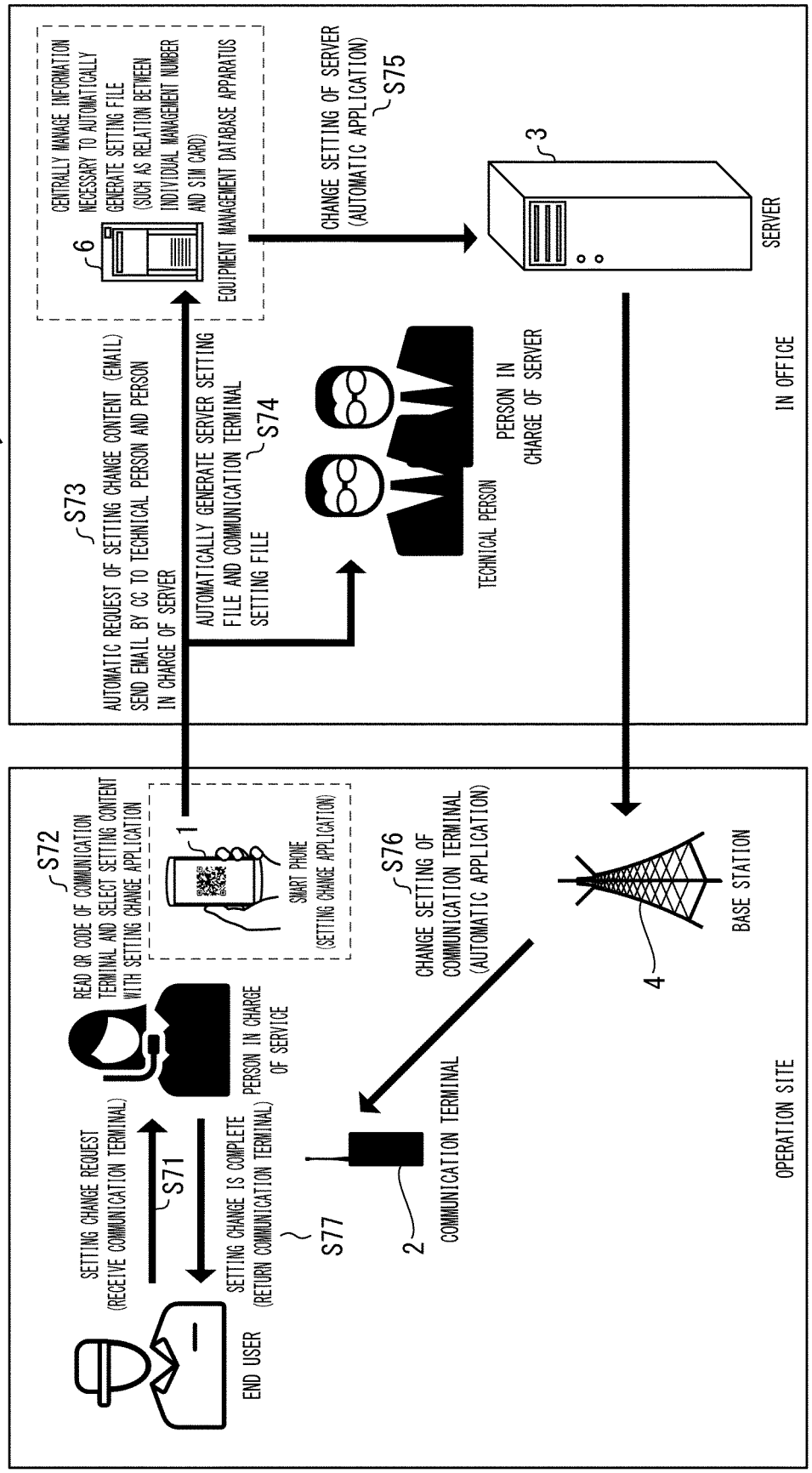
FIG. 13 is a diagram illustrating an overall process flow of a setting content changing system.

FIG. 13 is a diagram illustrating an overall process flow of the setting content changing system 100. First, when an end user has transmitted a setting change request to a person in charge of service, the person in charge of service receives a communication terminal 2 from the end user (S71).

The person in charge of service reads a QR code (registered trademark) of the communication terminal 2, selects a setting change item (S72), and transmits a setting change request by, for example, email to make an automatic transmission request of setting change content (S73). At this time, for confirmation by a technical person and a person in charge of the server, the same email is also transmitted to the technical person and the person in charge of the server.

Next, in the server 3, a server setting file and a terminal setting file are automatically generated (S74). The terminal setting file is a file including setting change content of the communication terminal described above, and the server setting file is a file including content which is changed according to setting change content of the communication terminal. The server 3 changes a setting of the server 3 with reference to the server setting file.

An equipment management database apparatus 6 centrally manages a relation between an individual management number of a communication terminal and a subscriber identity module (SIM) card or the like, information which is necessary to automatically generate a setting file, and the like, and carries out setting change of the server 3 as appropriate (S75).

The server 3 transmits, via the base station 4, a terminal setting file (setting change content) to the communication terminal 2. Upon receipt of the setting file for the communication terminal, the communication terminal changes the setting of the communication terminal 2 (S76). Upon completion of the setting change, the person in charge of service returns the communication terminal 2 to the end user (S77), and thus the process ends.

Software Implementation Example

The functions of part of or all of the first terminal apparatus 1, the second terminal apparatus 2, the external apparatus 3, and the third terminal apparatus 5 can be realized by hardware such as an integrated circuit (IC chip) or can be alternatively realized by software.

Figure 14:
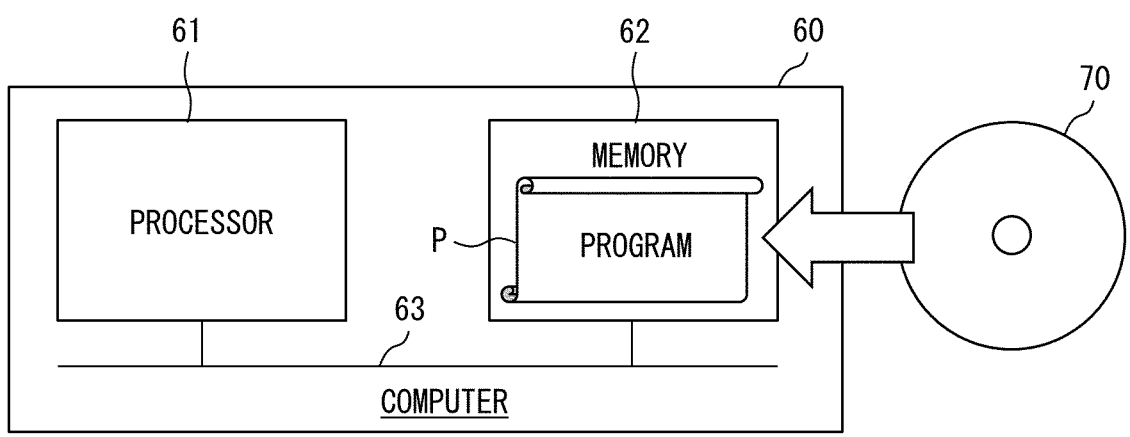
FIG. 14 is a diagram illustrating an example of a hardware configuration of a computer.

In the latter case, each of the first terminal apparatus 1, the second terminal apparatus 2, the external apparatus 3, and the third terminal apparatus 5 is realized by, for example, a computer that executes instructions of a program that is software realizing the foregoing functions. FIG. 14 illustrates an example of such a computer (hereinafter, referred to as "computer 60"). The computer 60 includes at least one processor 61 and at least one memory 62 which are connected to each other via an internal bus 63. The memory 62 stores a program P for causing the computer 60 to function as the first terminal apparatus 1, the second terminal apparatus 2, the external apparatus 3, and the third terminal apparatus 5. In the computer 60, the processor 61 reads the program P from the memory 62 and executes the program P, so that the functions of the first terminal apparatus 1, the second terminal apparatus 2, the external apparatus 3, and the third terminal apparatus 5 are realized.

As the processor 61, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, general-purpose computing on graphics processing units (GPGPU), or a combination of these. The memory 62 can be, for example, a flash memory, a hard disk drive (HDD), a solid state drive (SSD), or a combination of these.

Note that the computer 60 can further include a random access memory (RAM) in which the program P is loaded when the program P is executed and in which various kinds of data are temporarily stored. The computer 60 can further include a communication interface for carrying out transmission and reception of data with other apparatuses. The computer 60 can further include an input-output interface for connecting input-output apparatuses such as a keyboard, a mouse, a display and a printer.

The program P can be stored in a non-transitory tangible storage medium 70 which is readable by the computer 60. The storage medium 70 can be, for example, a compact disc-read only memory (CD-ROM), a digital versatile disc (DVD), a tape, a disk, a card, a semiconductor memory, a programmable logic circuit, or the like. The computer 60 can obtain the program P via the storage medium 70. The program P can be transmitted via a transmission medium. The transmission medium can be, for example, a communications network, a broadcast wave, or the like. The computer 60 can obtain the program P also via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

A method for changing setting content of a terminal apparatus, the method including: acquiring, by a first terminal apparatus, identification information of a second terminal apparatus and reference information which is referred to for changing a setting of the second terminal apparatus; transmitting, by the first terminal apparatus, a setting change request to an external apparatus, the setting change request including the identification information of the second terminal apparatus and the reference information which have been acquired; and receiving, by the second terminal apparatus, setting change content corresponding to the setting change request from the external apparatus, and changing, by the second terminal apparatus, setting content of the second terminal apparatus based on the setting change content.

According to the configuration, it is possible to easily select, on the first terminal apparatus side, a change of setting content of the second terminal apparatus. Moreover, it is possible to change a setting of the second terminal apparatus merely by acquiring identification information of the second terminal apparatus and reference information by the first terminal apparatus, and transmitting a setting change request by the first terminal apparatus.

Supplementary Note 2

The method according to supplementary note 1, in which: in the transmitting to the external apparatus, the first terminal apparatus displays setting change items of the second terminal apparatus, and transmits, to the external apparatus, the setting change request in which a setting change item that has been selected is included as the reference information.

According to the configuration, a user selects a setting change item of the second terminal apparatus and transmits the setting change item to the external apparatus with use of the first terminal apparatus. Merely with this operation, it is possible to change setting content of the second terminal apparatus, and this makes it possible to shorten an operation time.

Supplementary Note 3

The method according to supplementary note 1, in which: in the transmitting to the external apparatus, the first terminal apparatus acquires identification information of a third terminal apparatus, and the first terminal apparatus transmits, to the external apparatus, the setting change request in which the identification information of the third terminal apparatus is included as the reference information; and in the changing of setting content, the second terminal apparatus receives setting change content corresponding to the third terminal apparatus, and changes the setting content of the second terminal apparatus based on the setting change content.

According to the configuration, a user acquires identification information of the second terminal apparatus and identification information of the third terminal apparatus, and transmits the pieces of identification information to the external apparatus with use of the first terminal apparatus. Merely with this operation, it is possible to change setting content of the second terminal apparatus in accordance with the third terminal apparatus, and this makes it possible to shorten an operation time.

Supplementary Note 4

The method according to supplementary note 1, in which: in the transmitting to the external apparatus, the first terminal apparatus acquires identification information of a third terminal apparatus, the first terminal apparatus transmits, to the external apparatus, the setting change request which includes (i) the identification information of the second terminal apparatus that has been acquired, (ii) the identification information of the third terminal apparatus that has been acquired, and (iii) reference information that is referred to for changing settings of the second terminal apparatus and the third terminal apparatus, and the second terminal apparatus and the third terminal apparatus each receive, from the external apparatus, setting change content corresponding to the setting change request, and change setting content of the second terminal apparatus and the third terminal apparatus based on the setting change content.

According to the configuration, it is possible to change setting content of a plurality of terminal apparatuses at a time by acquiring pieces of identification information of the plurality of terminal apparatuses by the first terminal apparatus.

Supplementary Note 5

The method according to supplementary note 4, in which: in the transmitting to the external apparatus, the first terminal apparatus displays setting change items of the second terminal apparatus and the third terminal apparatus, and transmits, to the external apparatus, the setting change request in which a setting change item that has been selected is included as the reference information.

According to the configuration, a user selects a setting change item of the second terminal apparatus and the third terminal apparatus, and transmits the setting change item to the external apparatus with use of the first terminal apparatus. Merely with this operation, it is possible to change setting content of the second terminal apparatus and the third terminal apparatus, and this makes it possible to shorten an operation time.

Supplementary Note 6

The method according to supplementary note 1, in which: in the acquiring of the identification information of the second terminal apparatus, the first terminal apparatus displays images respectively corresponding to a plurality of other terminal apparatuses including the second terminal apparatus based on pieces of location information of the plurality of other terminal apparatuses, and the first terminal apparatus acquires identification information of a terminal apparatus which is included in the plurality of other terminal apparatuses and which corresponds to an image that has been selected; in the transmitting to the external apparatus, the first terminal apparatus transmits, to the external apparatus, the setting change request which includes (i) the identification information of the terminal apparatus corresponding to the image that has been selected and (ii) reference information that is referred to for changing a setting of that terminal apparatus; and in the changing of setting content, the terminal apparatus corresponding to the image that has been selected receives, from the external apparatus, setting change content corresponding to the setting change request, and changes, based on the setting change content, setting content of the terminal apparatus corresponding to the image that has been selected.

According to the configuration, a user selects an image of a terminal apparatus and a setting change item which are displayed. Merely with this operation, it is possible to change setting content of the corresponding terminal apparatus, and this makes it possible to shorten an operation time.

Supplementary Note 7

The method according to supplementary note 6, in which: in the transmitting to the external apparatus, the first terminal apparatus displays setting change items of the terminal apparatus corresponding to the image that has been selected, and transmits, to the external apparatus, the setting change request in which a setting change item that has been selected is included as the reference information.

According to the configuration, a user selects a setting change item of a terminal apparatus corresponding to the image that has been selected and transmits the setting change item to the external apparatus with use of the first terminal apparatus. Merely with this operation, it is possible to change setting content of the corresponding terminal apparatus, and this makes it possible to shorten an operation time.

Supplementary Note 8

The method according to any one of supplementary notes 1 through 7, in which: in the acquiring of the identification information of the second terminal apparatus, the first terminal apparatus captures an image that has been given to the second terminal apparatus, and analyzes the image to acquire the identification information of the second terminal apparatus.

According to the configuration, it is possible for the first terminal apparatus to easily acquire identification information of the second terminal apparatus.

Supplementary Note 9

A setting content changing system including a first terminal apparatus, a second terminal apparatus, and an external apparatus, the first terminal apparatus including an acquisition means that acquires identification information of the second terminal apparatus and reference information which is referred to for changing a setting of the second terminal apparatus and a transmission means that transmits a setting change request to the external apparatus, the setting change request including the identification information of the second terminal apparatus and the reference information which have been acquired by the acquisition means, and the second terminal apparatus including a reception means that receives, from the external apparatus, setting change content corresponding to the setting change request, and a changing means that changes setting content of the second terminal apparatus based on the setting change content.

According to the configuration, it is possible to easily select, on the first terminal apparatus side, a change of setting content of the second terminal apparatus. Moreover, it is possible to change a setting of the second terminal apparatus merely by acquiring identification information of the second terminal apparatus and reference information by the first terminal apparatus, and transmitting a setting change request by the first terminal apparatus.

Supplementary Note 10

The setting content changing system according to supplementary note 9, in which: the first terminal apparatus further includes a display means that displays setting change items of the second terminal apparatus; and the transmission means transmits, to the external apparatus, the setting change request in which a setting change item that has been selected from display of the display means is included as the reference information.

According to the configuration, a user selects a setting change item of the second terminal apparatus and transmits the setting change item to the external apparatus with use of the first terminal apparatus. Merely with this operation, it is possible to change setting content of the second terminal apparatus, and this makes it possible to shorten an operation time.

Supplementary Note 11

The setting content changing system according to supplementary note 9, further including a third terminal apparatus, in which: the acquisition means acquires identification information of the third terminal apparatus; the transmission means transmits, to the external apparatus, the setting change request in which the identification information of the third terminal apparatus is included as the reference information; the reception means receives setting change content corresponding to the third terminal apparatus; and the changing means changes setting content of the second terminal apparatus based on the setting change content.

According to the configuration, a user acquires identification information of the second terminal apparatus and identification information of the third terminal apparatus, and transmits the pieces of identification information to the external apparatus with use of the first terminal apparatus. Merely with this operation, it is possible to change setting content of the second terminal apparatus in accordance with the third terminal apparatus, and this makes it possible to shorten an operation time.

Supplementary Note 12

The setting content changing system according to supplementary note 9, further including a third terminal apparatus, in which: the acquisition means acquires identification information of the third terminal apparatus; the transmission means transmits, to the external apparatus, the setting change request which includes (i) the identification information of the second terminal apparatus that has been acquired, (ii) the identification information of the third terminal apparatus that has been acquired, and (iii) reference information that is referred to for changing settings of the second terminal apparatus and the third terminal apparatus; and the second terminal apparatus and the third terminal apparatus each receive, from the external apparatus, setting change content corresponding to the setting change request, and change setting content of the second terminal apparatus and the third terminal apparatus based on the setting change content.

According to the configuration, it is possible to change setting content of a plurality of terminal apparatuses at a time by acquiring pieces of identification information of the plurality of terminal apparatuses by the first terminal apparatus.

Supplementary Note 13

The setting content changing system according to supplementary note 12, in which: the first terminal apparatus further includes a display means that displays setting change items of the second terminal apparatus; and the transmission means transmits, to the external apparatus, the setting change request in which a setting change item that has been selected from display of the display means is included as the reference information.

According to the configuration, a user selects a setting change item of the second terminal apparatus, and transmits the setting change item to the external apparatus with use of the first terminal apparatus. Merely with this operation, it is possible to change setting content of the second terminal apparatus and the third terminal apparatus, and this makes it possible to shorten an operation time.

Supplementary Note 14

The setting content changing system according to supplementary note 9, in which: the first terminal apparatus further includes a display means that displays images respectively corresponding to a plurality of other terminal apparatuses including the second terminal apparatus based on pieces of location information of the plurality of other terminal apparatuses; the acquisition means acquires identification information of a terminal apparatus which is included in the plurality of other terminal apparatuses and which corresponds to an image that has been selected from the images displayed by the display means; the transmission means transmits, to the external apparatus, the setting change request which includes (i) the identification information of the terminal apparatus corresponding to the image that has been selected and (ii) reference information that is referred to for changing a setting of that terminal apparatus; and the terminal apparatus corresponding to the image that has been selected receives, from the external apparatus, setting change content corresponding to the setting change request, and changes, based on the setting change content, setting content of the terminal apparatus corresponding to the image that has been selected.

According to the configuration, a user selects an image of a terminal apparatus and a setting change item which are displayed. Merely with this operation, it is possible to change setting content of the corresponding terminal apparatus, and this makes it possible to shorten an operation time.

Supplementary Note 15

The setting content changing system according to supplementary note 14, in which: the display means displays setting change items of the terminal apparatus corresponding to the image that has been selected; and the transmission means transmits, to the external apparatus, the setting change request in which a setting change item that has been selected from display of the display means is included as the reference information.

According to the configuration, a user selects a setting change item of a terminal apparatus corresponding to the image that has been selected and transmits the setting change item to the external apparatus with use of the first terminal apparatus. Merely with this operation, it is possible to change setting content of the corresponding terminal apparatus, and this makes it possible to shorten an operation time.

Supplementary Note 16

The setting content changing system according to any one of supplementary notes 9 through 15, in which: the acquisition means captures an image that has been given to the second terminal apparatus, and analyzes the image to acquire the identification information of the second terminal apparatus.

According to the configuration, it is possible for the first terminal apparatus to easily acquire identification information of the second terminal apparatus.

Supplementary Note 17

A terminal apparatus including: an acquisition means that acquires identification information of a target terminal apparatus whose setting is to be changed and reference information which is referred to for changing the setting of the target terminal apparatus; and a transmission means that transmits a setting change request which includes the identification information and the reference information which have been acquired by the acquisition means.

According to the configuration, it is possible to easily select, on the first terminal apparatus side, a change of setting content of the target terminal apparatus whose setting is to be changed. Moreover, it is possible to change a setting of the target terminal apparatus merely by acquiring identification information of the target terminal apparatus and reference information by the first terminal apparatus, and transmitting a setting change request by the first terminal apparatus.

Supplementary Note 18

An information processing apparatus, including: a reception means that receives a setting change request which includes (i) identification information of a target terminal apparatus whose setting is to be changed and (ii) reference information which is referred to for changing the setting of the target terminal apparatus; and a transmission means that transmits, to the target terminal apparatus which is designated by the identification information, an instruction for changing the setting to setting content which is specified by the reference information.

According to the configuration, the target terminal apparatus whose setting is to be changed can receive an instruction for changing the setting to setting content which is specified by the reference information, and it is possible to easily change the setting of the target terminal apparatus.

Supplementary Note 19

A method for changing setting content of a terminal apparatus, the method including: acquiring identification information of a target terminal apparatus whose setting is to be changed and reference information which is referred to for changing the setting of the target terminal apparatus; and transmitting a setting change request which includes the identification information and the reference information which have been acquired.

According to the configuration, it is possible to easily select, on the first terminal apparatus side, a change of setting content of the target terminal apparatus whose setting is to be changed. Moreover, it is possible to change a setting of the target terminal apparatus merely by acquiring identification information of the target terminal apparatus and reference information by the first terminal apparatus, and transmitting a setting change request by the first terminal apparatus.

Supplementary Note 20

A method for providing an instruction for changing a setting of an information processing apparatus, the method including: receiving a setting change request which includes (i) identification information of a target terminal apparatus whose setting is to be changed and (ii) reference information which is referred to for changing the setting of the target terminal apparatus; and transmitting, to the target terminal apparatus which is designated by the identification information, an instruction for changing the setting to setting content which is specified by the reference information.

According to the configuration, the target terminal apparatus whose setting is to be changed can receive an instruction for changing the setting to setting content which is specified by the reference information, and it is possible to easily change the setting of the target terminal apparatus.

Supplementary Note 21

A computer program for causing a computer to function as a terminal apparatus, the computer program causing the computer to function as: an acquisition means that acquires identification information of a target terminal apparatus whose setting is to be changed and reference information which is referred to for changing the setting of the target terminal apparatus; and a transmission means that transmits a setting change request which includes the identification information and the reference information which have been acquired by the acquisition means.

Supplementary Note 22

A computer program for causing a computer to function as an information processing apparatus, the computer program causing the computer to function as: a reception means that receives a setting change request which includes (i) identification information of a target terminal apparatus whose setting is to be changed and (ii) reference information which is referred to for changing the setting of the target terminal apparatus; and a transmission means that transmits, to the target terminal apparatus which is designated by the identification information, an instruction for changing the setting to setting content which is specified by the reference information.

Supplementary Note 23

A terminal apparatus including at least one processor, the at least one processor carrying out: a process of acquiring identification information of a target terminal apparatus whose setting is to be changed and reference information which is referred to for changing the setting of the target terminal apparatus; and a process of transmitting a setting change request which includes the identification information and the reference information which have been acquired.

Note that the terminal apparatus can further include a memory. The memory can store a program for causing the processor to carry out the acquisition process and the transmission process. The program can be stored in a computer-readable non-transitory tangible storage medium.

Supplementary Note 24

An information processing apparatus, including at least one processor, the at least one processor carrying out: a process of receiving a setting change request which includes (i) identification information of a target terminal apparatus whose setting is to be changed and (ii) reference information which is referred to for changing the setting of the target terminal apparatus; and a process of transmitting, to the target terminal apparatus which is designated by the identification information, an instruction for changing the setting to setting content which is specified by the reference information.

Note that the information processing apparatus can further include a memory. The memory can store a program for causing the processor to carry out the reception process and the transmission process. The program can be stored in a computer-readable non-transitory tangible storage medium.

REFERENCE SIGNS LIST

1: First terminal apparatus (smart phone)
2: Second terminal apparatus (communication terminal)
3: External apparatus (server)
4: Base station
5: Third terminal apparatus (communication terminal)
6: Equipment management database apparatus
11: Acquisition section
12, 32: Transmission section
13: Display section
21, 31: Reception section
22: Changing section
60: Computer
61: Processor
62: Memory
63: Internal bus
70: Storage medium
P: Program

What is claimed is:

1. A method for changing setting content of a terminal apparatus, said method comprising:
    acquiring, by a first terminal apparatus, identification information of a second terminal apparatus and reference information which is referred to for changing a setting of the second terminal apparatus;
    transmitting, by the first terminal apparatus, a setting change request to an external apparatus, the setting change request including the identification information of the second terminal apparatus and the reference information which have been acquired; and
    receiving, by the second terminal apparatus, setting change content corresponding to the setting change request from the external apparatus, and changing, by the second terminal apparatus, setting content of the second terminal apparatus based on the setting change content,
    wherein:
    in the transmitting to the external apparatus,
        the first terminal apparatus acquires identification information of a third terminal apparatus, and
        the first terminal apparatus transmits, to the external apparatus, the setting change request in which the identification information of the third terminal apparatus is included as the reference information; and
    in the changing of setting content,
        the second terminal apparatus receives setting change content corresponding to the third terminal apparatus, and changes the setting content of the second terminal apparatus based on the setting change content.

2. The method according to claim 1, wherein:
    in the transmitting to the external apparatus, the first terminal apparatus displays setting change items of the second terminal apparatus, and transmits, to the external apparatus, the setting change request in which a setting change item that has been selected is included as the reference information.

3. The method according to claim 1, wherein:
    in the transmitting to the external apparatus,
        the first terminal apparatus transmits, to the external apparatus, the setting change request which includes (i) the identification information of the second terminal apparatus that has been acquired, and (ii) reference information that is referred to for changing settings of the second terminal apparatus and the third terminal apparatus, and
        the second terminal apparatus and the third terminal apparatus each receive, from the external apparatus, setting change content corresponding to the setting change request, and change setting content of the second terminal apparatus and the third terminal apparatus based on the setting change content.

4. The method according to claim 3, wherein:
    in the transmitting to the external apparatus,
        the first terminal apparatus displays setting change items of the second terminal apparatus and the third terminal apparatus, and transmits, to the external apparatus, the setting change request in which a setting change item that has been selected is included as the reference information.

5. The method according to claim 1, wherein:
in the acquiring of the identification information of the second terminal apparatus,
the first terminal apparatus captures an image that has been given to the second terminal apparatus, and analyzes the image to acquire the identification information of the second terminal apparatus.

6. A method for changing setting content of a terminal apparatus, said method comprising:
acquiring, by a first terminal apparatus, identification information of a second terminal apparatus and reference information which is referred to for changing a setting of the second terminal apparatus;
transmitting, by the first terminal apparatus, a setting change request to an external apparatus, the setting change request including the identification information of the second terminal apparatus and the reference information which have been acquired; and
receiving, by the second terminal apparatus, setting change content corresponding to the setting change request from the external apparatus, and changing, by the second terminal apparatus, setting content of the second terminal apparatus based on the setting change content, wherein:
in the acquiring of the identification information of the second terminal apparatus,
the first terminal apparatus displays images respectively corresponding to a plurality of other terminal apparatuses including the second terminal apparatus based on pieces of location information of the plurality of other terminal apparatuses, and
the first terminal apparatus acquires identification information of a terminal apparatus which is included in the plurality of other terminal apparatuses and which corresponds to an image that has been selected;
in the transmitting to the external apparatus,
the first terminal apparatus transmits, to the external apparatus, the setting change request which includes (i) the identification information of the terminal apparatus corresponding to the image that has been selected and (ii) reference information that is referred to for changing a setting of that terminal apparatus; and
in the changing of setting content,
the terminal apparatus corresponding to the image that has been selected receives, from the external apparatus, setting change content corresponding to the setting change request, and changes, based on the setting change content, setting content of the terminal apparatus corresponding to the image that has been selected.

7. The method according to claim 6, wherein:
in the transmitting to the external apparatus,
the first terminal apparatus displays setting change items of the terminal apparatus corresponding to the image that has been selected, and transmits, to the external apparatus, the setting change request in which a setting change item that has been selected is included as the reference information.

8. A setting content changing system comprising a first terminal apparatus, a second terminal apparatus, and an external apparatus,
the first terminal apparatus including at least one first processor, the at least one first processor carrying out
an acquisition process of acquiring identification information of the second terminal apparatus and reference information which is referred to for changing a setting of the second terminal apparatus and
a transmission process of transmitting a setting change request to the external apparatus, the setting change request including the identification information of the second terminal apparatus and the reference information which have acquired, and
the second terminal apparatus including at least one second processor, the at least one second processor carrying out
a reception process of receiving, from the external apparatus, setting change content corresponding to the setting change request, and
a changing process of changing setting content of the second terminal apparatus based on the setting change content,
further comprising a third terminal apparatus, wherein:
in the acquisition process, the at least one first processor acquires identification information of the third terminal apparatus;
in the transmission process, the at least one first processor transmits, to the external apparatus, the setting change request in which the identification information of the third terminal apparatus is included as the reference information;
in the reception process, the at least one second processor receives setting change content corresponding to the third terminal apparatus; and
in the changing process, the at least one second processor changes setting content of the second terminal apparatus based on the setting change content.

9. The setting content changing system according to claim 8, wherein:
the at least one first processor further carries out a display process of displaying setting change items of the second terminal apparatus; and
in the transmission process, the at least one first processor transmits, to the external apparatus, the setting change request in which a setting change item that has been selected from display is included as the reference information.

10. The setting content changing system according to claim 8, further comprising a third terminal apparatus, wherein:
in the transmission process, the at least one first processor transmits, to the external apparatus, the setting change request which includes (i) the identification information of the second terminal apparatus that has been acquired, (ii) the identification information of the third terminal apparatus that has been acquired, and (iii) reference information that is referred to for changing settings of the second terminal apparatus and the third terminal apparatus;
the third terminal apparatus includes at least one third processor; and
the at least one second processor and the at least one third processor each carry out a process of receiving, from the external apparatus, setting change content corresponding to the setting change request, and changing setting content of the second terminal apparatus and the third terminal apparatus based on the setting change content.

11. The setting content changing system according to claim 10, wherein:
the at least one first processor further carries out a display process of displaying setting change items of the second terminal apparatus; and
in the transmission process, the at least one first processor transmits, to the external apparatus, the setting change request in which a setting change item that has been selected from display is included as the reference information.

12. The setting content changing system according to claim 8, wherein:
in the acquisition process, the at least one first processor captures an image that has been given to the second terminal apparatus, and analyzes the image to acquire the identification information of the second terminal apparatus.

13. A setting content changing system comprising a first terminal apparatus, a second terminal apparatus, and an external apparatus,
the first terminal apparatus including at least one first processor, the at least one first processor carrying out
an acquisition process of acquiring identification information of the second terminal apparatus and reference information which is referred to for changing a setting of the second terminal apparatus and
a transmission process of transmitting a setting change request to the external apparatus, the setting change request including the identification information of the second terminal apparatus and the reference information which have acquired, and
the second terminal apparatus including at least one second processor, the at least one second processor carrying out
a reception process of receiving, from the external apparatus, setting change content corresponding to the setting change request, and
a changing process of changing setting content of the second terminal apparatus based on the setting change content, wherein:
the at least one first processor further carries out a display process of displaying images respectively corresponding to a plurality of other terminal apparatuses including the second terminal apparatus based on pieces of location information of the plurality of other terminal apparatuses;
in the acquisition process, the at least one first processor acquires identification information of a terminal apparatus which is included in the plurality of other terminal apparatuses and which corresponds to an image that has been selected from the images displayed;
in the transmission process, the at least one first processor transmits, to the external apparatus, the setting change request which includes (i) the identification information of the terminal apparatus corresponding to the image that has been selected and (ii) reference information that is referred to for changing a setting of that terminal apparatus; and
the at least one second processor carries out a process in which the terminal apparatus corresponding to the image that has been selected receives, from the external apparatus, setting change content corresponding to the setting change request, and changes, based on the setting change content, setting content of the terminal apparatus corresponding to the image that has been selected.

14. The setting content changing system according to claim 13, wherein:
the at least one first processor carries out a process of displaying setting change items of the terminal apparatus corresponding to the image that has been selected; and
in the transmission process, the at least one first processor transmits, to the external apparatus, the setting change request in which a setting change item that has been selected from display is included as the reference information.

* * * * *